G. T. BEAUREGARD.
MACHINERY FOR PROPELLING CARS.
No. 7,669. Reissued May 8, 1877.
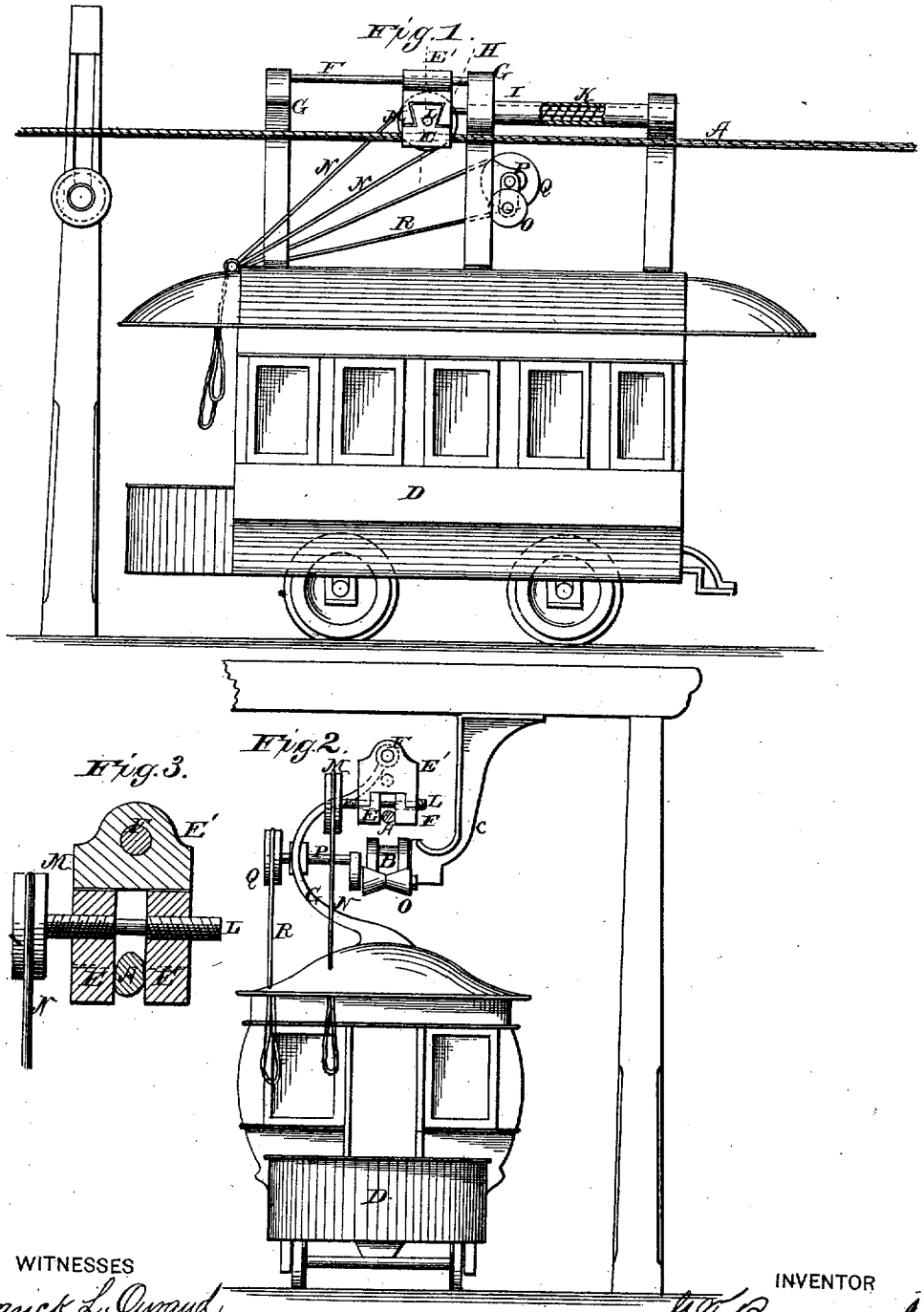
WITNESSES
Franck L. Durand
Frank Gall
INVENTOR
G. T. Beauregard
Alexander Mason
ATTORNEYS.
N. PETERS, Photo-Lithographer, Washington, D. C.

UNITED STATES PATENT OFFICE.

G. T. BEAUREGARD, OF NEW ORLEANS, LOUISIANA.

IMPROVEMENT IN MACHINERY FOR PROPELLING CARS.

Specification forming part of Letters Patent No. 97,343, dated November 30, 1869; reissue No. 7,669, dated May 8, 1877; application filed April 12, 1877.

*To all whom it may concern:*

Be it known that I, G. T. BEAUREGARD, of New Orleans, in the parish of Orleans and State of Louisiana, have invented new and Improved Machinery for Propelling Cars and Boats; and I do hereby declare that the following is a full, clear, and exact description thereof, which will enable others skilled in the art to make and use the same, reference being had to the accompanying drawing, forming part of this specification.

This invention relates to new and useful improvements in machinery or apparatus for propelling cars and other vehicles on land, and boats on canals or rivers, by means of overhead wire or other rope, chain, or band, deriving motion from stationary engines or other power at intervals along the route.

The invention comprises an arrangement of clamping devices, for engaging and disengaging the rope, having a constant movement above roller or pulley supports for it, suspended upon framing along the road, the clamp being connected to brackets, upon the top of the car, by a spring or yielding connection, to relieve the car or boat from injurious shocks at starting, and arranged to be operated by the conductor on the car, vehicle, or boat.

The invention also comprises an arrangement of means for raising the rope, when it is to be clamped for setting the car in motion, the pendent supports of which are necessarily lower than the clutch, to permit it to pass over them, also arranged for operation by the person standing on the car.

Figure 1 represents a side elevation of a car provided with my improvement, also showing the cord or rope and a section of the suspending-framing. Fig. 2 represents an end elevation of the same. Fig. 3 represents a sectional elevation of the clamp.

The rope, chain, or band A is made in long sections, and caused, by any suitable driving mechanism, to run over pulleys or guide-rollers B, suspended on curved brackets C from any suitable framing arranged along the route at suitable intervals. The said rope, &c., is kept in constant motion and may be arranged to run up one track and down the other when double tracks are used.

The cars D are provided with clamping-jaws E, suspended from a block, E′, on a rod, F, supported by curved brackets G G, rising from the top of the car, above the rollers B, the suspending-brackets of which are also curved, the curvature being in the direction opposite to that of the bracket G, permitting the block E′ and clamp to be carried above the said roller B, and without any interference of either set of brackets.

The block E′ is capable of sliding on the rod F, and is provided with a piston-rod, H, working in a tube supported between the central bracket G, and another behind it. This tube carries a spiral spring, K, wound upon the rod, and bearing against the piston at one end and the end of the tube at the other, and has a tendency to keep the block E′ drawn back against or near to the central bracket G. The rear end of the tube is provided with an air-passage and valve, opening inward, to admit air behind the piston when forward, to prevent the too sudden return of the block when the rope is let go.

The clamp consists of a pair of movable jaws or slides, E E, which move laterally in opposite directions in dovetailed grooves of the block E′, and a clamping-screw, L, is provided with an operating-pulley, M, over which a cord or belt, N, works, the same being arranged for the attendant to operate when standing on the platform of the car; or it may be at any other convenient place. By turning this wheel M, the screw L, which is right and left threaded, will move the slides E E to and from each other, and clamp by the jaws the rope, or let it go. When the jaws are worn out, they can easily be replaced.

O represents an elevating-roller, mounted on a wrist-pin of a crank-shaft, P, supported on the bracket just behind the clutch, and arranged to be turned by a cord, R, working over a pulley, Q. This cord R is also arranged to be reached by the conductor on the platform or other part of the car or boat.

This roller O may be kept in an elevated position during the trip, so that the attendant will only have to operate the clamping device for stopping and starting the car.

The operation of the griping apparatus is as follows: By means of the cord R the pulley Q is turned, which raises, by the crank-shaft P, the roller O. The latter, by its shape, will receive the moving rope, guide it, and bring it between the jaws; then, by turning the hand-wheel M and screw L, the jaws are brought together. They will at first slip, and at the same time the spring K will yield and allow the clamp to move in advance of the car sufficiently to set it in motion without undue shocks or jars.

By the careful turning of the screw L of the jaws this spring K may be done away with entirely, and the block E′ may be solid on the bracket G.

The car or vehicle can be stopped during the trip without letting go the rope entirely. It is only necessary to turn the wheel M a little, by which the jaws are opened a trifle, and the rope remains supported by the pulley O, which is in its elevated position, and moves through the jaws without friction.

Instead of placing the propelling-rope and clutching devices above the car, they may be placed at the side.

I propose to make use of this apparatus for propelling boats on canals, and for other similar purposes.

Having thus described my invention, I claim as new and desire to secure by Letters Patent—

1. The combination, with a car or other vehicle, and a constantly-moving rope, &c., A, suspended above or at the side of the car or vessel to be propelled, of the reciprocating block E′, clamping-slides E E, right and left threaded screw L, piston H, and spring K, substantially as specified.

2. The combination, with the rope A and clamping-jaws, of the elevating-roller O, crank-shaft P, and operating-cord R, substantially as specified.

3. The combination, with the clamping-jaws E and operating-screw L, of the pulley M and operating-cord, arranged substantially as specified.

4. The arrangements of the suspending-brackets C and the bracket G, for carrying the clutch above the cord, substantially as specified.

5. In a griping device for propelling cars and boats, the slides or jaws E E, constructed to move laterally in opposite directions, in combination with a moving cord or rope, A, substantially as and for the purposes herein set forth.

6. The laterally-moving jaws or slides E E, detachably connected to the reciprocating block E′, substantially as and for the purposes herein set forth.

7. The combination of the shifting guide-roller O with the griping jaws or slides E E, substantially as and for the purposes herein set forth.

8. The cord N, operating-wheel M, turning the right and left threaded screw L, in combination with the oppositely-moving slides E E, substantially as described.

9. The bracket G, so bent that it carries the clutching device clear of the pulley B, when the position of the latter is between the propelling-rope and the vehicle, substantially as specified.

G. T. BEAUREGARD.

Attest:
ANDREW HERO, Jr.,
P. H. CONAND.